UNITED STATES PATENT OFFICE.

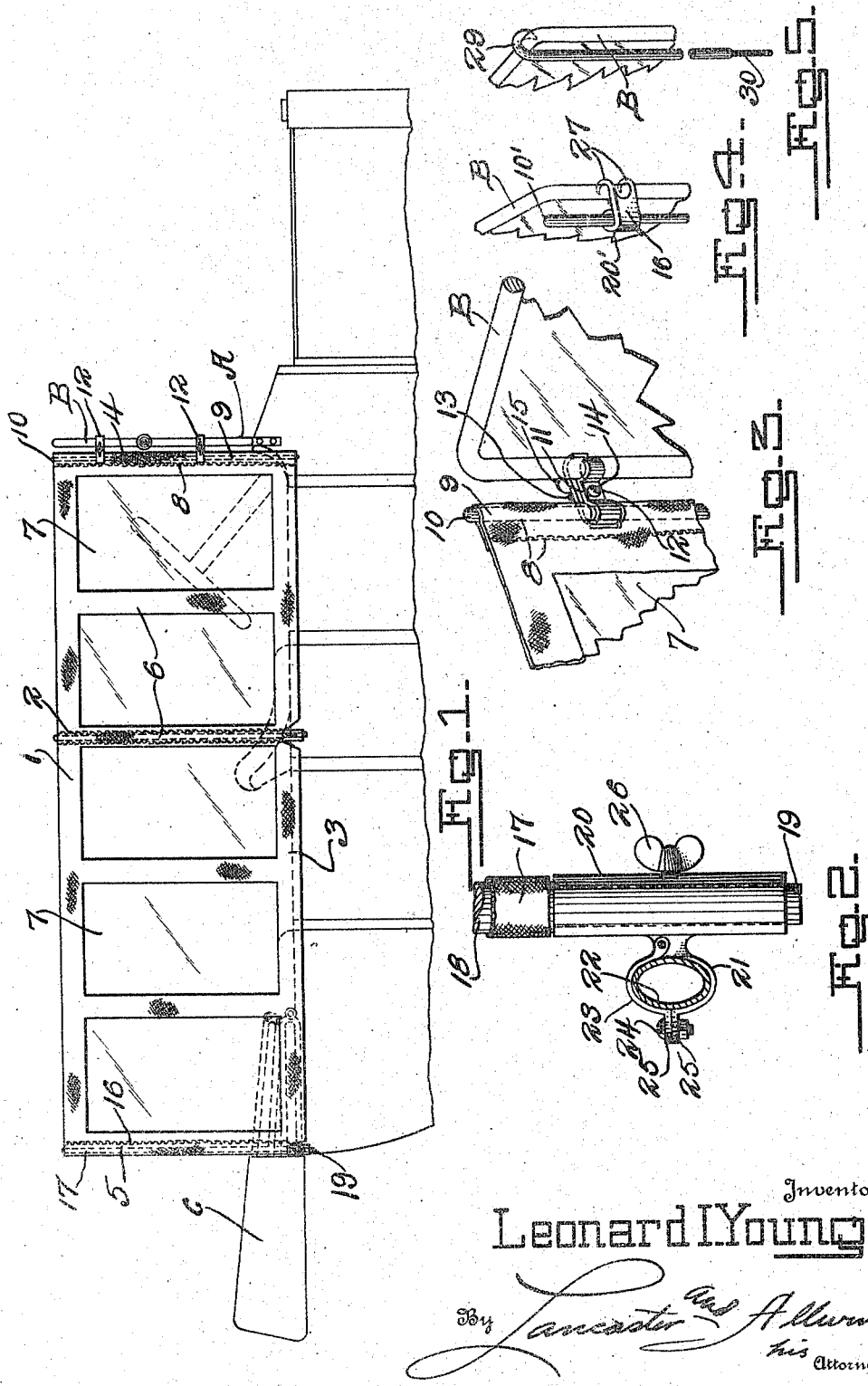

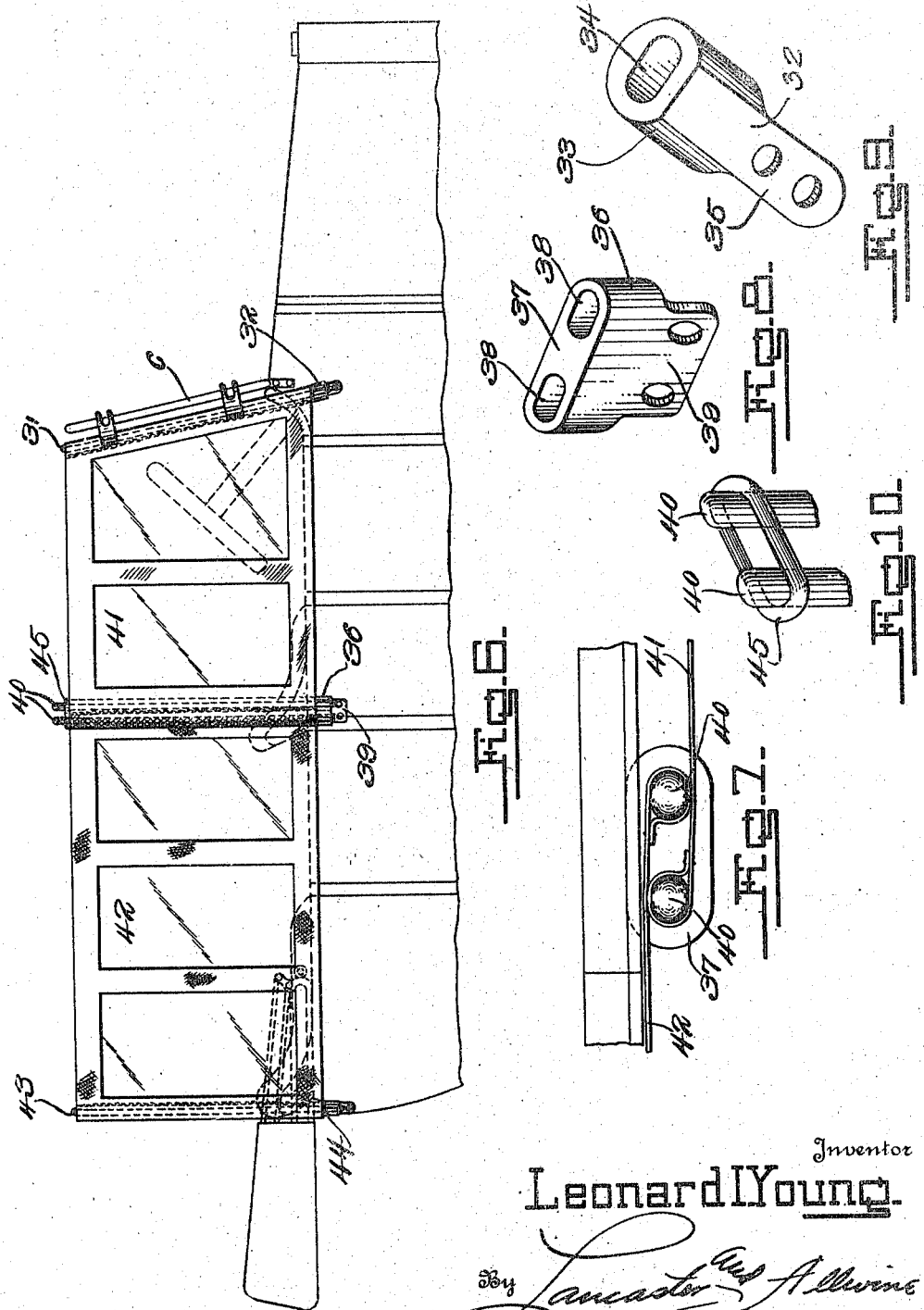

LEONARD I. YOUNG, OF FREDONIA, NEW YORK.

AUTOMOBILE WIND-SHIELD.

1,291,342.

Specification of Letters Patent. Patented Jan. 14, 1919.

Application filed November 17, 1917. Serial No. 202,484.

*To all whom it may concern:*

Be it known that I, LEONARD I. YOUNG, a citizen of the United States, and a resident of Fredonia, in the county of Chautauqua and State of New York, have invented certain new and useful Improvements in Automobile Wind-Shields, of which the following is a specification.

This invention relates to improvements in wind shields, and more particularly to side wind shields for automobiles especially adapted for shielding the occupants of the front and rear seat of the automobile from the wind sweeping across from either side of the automobile.

One of the principal objects of the invention is to provide an elongated side wind shield extending from the front to the rear of the automobile and adapted to be mounted on both or either side of the automobile when the automobile top is down whereby the occupants of the vehicle may receive the benefit and enjoy the pleasure of the sunshine in the spring and fall but will be protected against the high winds which occur in these seasons of the year while, at the same time, permitting the occupants to view the surrounding country while touring.

A further object of the invention is to provide a side wind shield of this character that may be folded or rolled to compact form whereby the shield may be stored in an out-of-the-way place when not in use and which will admit of the quick and expeditious mounting of the shield when desired.

A further object of the invention is to provide a wind shield of this character that will be supported at the front wind shield and at a point near the rear of the vehicle whereby the entire side of the automobile may be protected from strong winds and which will possess sufficient durability to withstand the action of the elements whereby the occupants may be protected during a driving rain storm; and which will be more or less ornamental in appearance and pleasing to the esthetic sense of the observer.

A further object of the invention is to provide a side wind shield of this character that may be readily separated by the occupants of the vehicle for permitting persons in the rear to easily get out of the vehicle without necessarily loosening any more than a comparatively small area of the curtain.

The invention further aims at the provision of a wind shield of this character that will permit rolling upon the supporting rods for the shield whereby loosening or stretching of the shield may be taken up so that the shield may be drawn and held taut at all time.

A further object of the invention is the provision of a wind shield which will consist of a few parts and be simple in construction, inexpensive to manufacture and durable and efficient in use.

For a full description of the invention and the advantages and merits thereof, reference is to be had to the following detailed description and the accompanying drawing, wherein is illustrated the preferred form of my invention and, in which:

Figure 1 is a fragmentary side elevation of an automobile showing a wind shield mounted thereon and constructed in accordance with my invention.

Fig. 2 is a detail elevation of the rear fastening element.

Fig. 3 is a fragmentary perspective of the front portion of the shield showing the manner of connecting the same to the front wind shield.

Fig. 4 is a fragmentary detail perspective of a modified form of the fastening element.

Fig. 5 is a fragmentary perspective of a further modification of the manner of fastening the shield to the front wind shield of the vehicle.

Fig. 6 is a fragmentary side elevation of an automobile showing a slightly modified form of the invention applied thereto.

Fig. 7 is a plan of a detail of the invention.

Fig. 8 is a perspective view of one of the supporting brackets.

Fig. 9 is a perspective view of another of the end supporting brackets.

Fig. 10 is a perspective view illustrating the method of maintaining the ends of the supporting rods in proper relative position.

Referring to the drawing wherein is illustrated the preferred form of my invention and in which like numerals of reference indicate corresponding parts throughout the several views, the automobile body is provided with the usual front wind shield A which includes the wind shield frame B extending upright and supporting the glass panel when the wind shield is in operative position. The side wind shield constituting my invention comprises a frame 1 which may be of any desired length and is constructed of any suitable material such as rubberized fabric whereby the same may be rolled or folded when not in use. This frame includes longitudinal strips 2 and 3 and the end strips 4 and 5 and the longitudinally spaced bracing strips 6 which may be of any desired number according to the length of the frame and the number of panels to be mounted therein. A panel 7 is mounted in each of the open spaces provided by the strips 6 and these panels are constructed of suitable transparent material that may be readily rolled without injury. Mica or isinglass may be employed for this purpose and the marginal edges of the panel will be suitably fastened by stitching or otherwise to the frame. The forward end strip 4 has its margin folded upon itself and stitched as indicated at 8 to form an end sleeve portion 9 for the reception of a supporting rod 10. This rod is equal in length to the width of the frame, the frame and panels may be rolled upon this rod when the device is not in use.

For attaching the front end of the shield to the frame B of the front wind shield, I have provided clamping devices indicated at 11. Each fastening device includes the complementary clamp members 12 and 13 which have their intermediate straight portions provided with openings through which a bolt 14 is extended having a thumb nut 15 at its end whereby the two clamp members may be drawn together. The ends of the clamp members are suitably bent to fit the frame of the wind shield and the sleeve 9 embracing the rod 10 so that when the thumb nut is tightened, the clamp members will securely engage the frame B and the front end of the side wind shield to securely hold the same in upright position at the front end.

The rear end strip 5 is also folded upon itself and sewed as at 16 to form the sleeve 17 for receiving a supporting rod 18 which is longer than the width of the frame whereby an extension 19 is provided depending from the lower marginal edge of the frame at the rear thereof. The device will be used when the top C is down, I have provided means for supporting the rod 18 from one of the bows of the top structure. As shown in Fig. 2, of the drawing, a sleeve or socket 20 is provided with a projecting clamp arm 21 adapted to fit around the bow 22 of the top structure. A pivoted clamp arm 23 is adapted to overlie the top of the bow 22 and the ends of the clamp elements 21 and 23 are connected together by a bolt 24 extended through the outwardly bent end of the clamp members which form ears 25. At a point diametrically opposite to the supporting clamp, I have provided a set screw 26 inserted through a screw-threaded opening in the sleeve 20 and engageable with the extension 19 of the rod 18. In this manner the rod may be tightened to hold the same securely in the socket when the rear end of the frame is mounted in position.

It will be obvious that a plurality of these sockets 20 may be spaced along the body of the vehicle at the side thereof whereby a plurality of the rods 18 may be employed to support the shield if desired. A single supporting rod may be mounted on the side of the body intermediate the ends thereof so that only half of the wind shield may be employed if desired, for shielding only the occupants of the rear seat when the driver does not desire the protection thus afforded.

In Fig. 4, I have illustrated a slightly modified form of the method of attaching the front end of the shield to the front wind shield B and the same includes an attaching plate 16 having its end bifurcated and bent to provide the co-acting hooks 27 extended around the frame B of the front wind shield and having its opposite end curved to provide a cylindrical sleeve 20' for the reception of the rod 10' to which the sleeve 9 may be attached. With this form of fastening element, the rear end of the shield may be wrapped or rolled upon the rod 18 until the frame is drawn taut to take up any slack therein.

A slightly further modified form is illustrated in Fig. 5 of the drawing, wherein the upper end of the front supporting rod is provided with a hook 29 at its upper end and this hook is adapted to extend over and engage the top horizontal portion of the front wind shield frame B while the opposite lower end is reduced in diameter to form a pintle 30 which may be received in a suitable socket carried by the auto body or wind shield frame as desired.

In the Figs. 6, 7, 8, 9, and 10, wherein is illustrated a slightly modified form of the wind shield, it will be observed that the usual front wind shield C is disposed at an angle as is common to some types of automobiles. The front supporting rod 31 in this instance, is also disposed at an angle and is parallel to the sides of the wind shield C and the lower end of the front rod 31 is received in a front supporting socket 32 shown in detail in Fig. 9 of the drawing, and which consists of the sleeve 33 having an elliptical opening 34 adapted to receive the rods 31 which, as shown in Fig. 7 of the drawing, will be observed to be elliptical in cross section. It will be understood, of course, that one of these supporting rods 31 is mounted on each side of the automobile, a socket 33 being provided in each instance. An attaching flange 35 is secured to the automobile body so that the socket may be supported in a manner to receive the end of the rod 31.

Attached to the body of the vehicle directly behind the front seat of the same is a double socket 36 shown in detail in Fig. 8 of the drawing, the same including the elongated casing 37 having two spaced apart elliptical openings 38 and an attaching flange 39 provided with openings for the reception of fastening screws whereby this double socket may be fixed to the body of the vehicle. The two intermediate supporting rods 40 are adapted to have their ends received in this double socket and the front seat wind shield 41 is attached to the rearmost of the two rods 40 as shown to advantage in Fig. 7 of the drawing, while the front edge of this front seat wind shield 41 is secured to the rod 31. The rear seat wind shield 42 is attached to the foremost of the rods 40 and, each of the rods will be mounted in the openings 38 and will snugly fit in the same by virtue of their formation which is elliptical in cross section as shown in Fig. 7. The rear seat wind shield 42 extends to the rear of the vehicle body and is attached to the rear supporting rod 43 which is mounted in a socket 44 of the same structure as the socket 33 for the front supporting rod. With this construction, the overlapped meeting edges of the front seat wind shield 41 and the rear seat wind shield 42, the wind will be prevented from blowing into the vehicle but the structure will permit either the front or the rear shields to be readily removed without disturbing the one or the other so that a front passenger may depart from the front seat without disturbing the rear wind shield while the rear rod 43 may be readily removed for permitting the rear wind shield to be temporarily turned aside for permitting the exit of one of the passengers at the rear of the vehicle without disturbing the front section 41 of the wind shield.

The particular construction of the rods 31, 40 and 43, will permit the wind shields to be readily rolled upon the rods when any slackening or loosening occurs thereby assuring a tightly drawn and taut wind shield at all times.

It will be readily apparent that the device may be quickly demounted and rolled or wrapped into a compact form for placing it beneath the cushions of the vehicle or any other out of the way place and it will also be obvious that one of the shields may be arranged at either side of the vehicle when desired. The occupants may readily view the surrounding country through the transparent panels when the device is mounted in position and will thereby receive the benefit of the sunshine while they will be protected from the uncomfortable wind blowing from either direction.

From the foregoing, it will be observed that a very simple and durable wide wind shield for automobiles has been provided, the details of which embody the preferred form. I desire it to be understood, however, that slight changes may be made in the details of construction without departing from the spirit of the invention or the scope of the claims hereunto appended.

I claim:

1. The combination with a vehicle body having a front wind shield and a top having bows, of a side wind shield including a flexible body strip, a supporting rod at the rear end of said body strip, a sleeve mounted upon said supporting rod, and clamping means on said sleeve for engagement with one of the bows of said top.

2. The combination with a vehicle body having a front wind shield and a top having bows, of a side wind shield including a flexible body strip, a flexible rod at the rear end of said body strip, a sleeve mounted upon said rear supporting rod, clamping means on said sleeve for engagement with one of the bows of said top, bracing means at the front end and intermediate the ends of said flexible body strip to maintain the same in a vertical position, and means for attaching the front end of the flexible strip to the vehicle body.

3. The combination with a vehicle body having a front wind shield and a top having bows, of a side wind shield including a flexible body strip, supporting rods at the front and rear ends of said body strip, means for detachably connecting said front reinforcing rod to said front wind shield, a sleeve mounted upon said rear reinforcing rod, and clamping means on said sleeve for engagement with one of the bows of said top.

4. The combination with a vehicle body having a front wind shield and top having bows, of a side wind shield including a flexible body strip having transparent panels therein, supporting rods at the front and rear ends of said body strip, adjustable means for detachably connecting said front reinforcing rod to said wind shield, a sleeve adjustably mounted upon said rear reinforcing rod, and laterally extending clamping means formed upon said sleeve for engagement with one of the bows of said top.

5. In an automobile side wind shield, the combination of an automobile body having a front wind shield and a folded top at its rear, a flexible frame including longitudinal strips having end strips connected thereto, the latter being folded upon themselves to provide front and rear sleeves at the end of the frame, a front supporting rod extending through the front sleeve, clamps engaging the said sleeve and clamped to the said rod and to the front wind shield frame, a rear supporting rod extending through the sleeve at the rear of the frame and a supporting sleeve fastened to one of the bows of the said folded top and receiving the said rear supporting rod.

LEONARD I. YOUNG.